(12) United States Patent
Shukla et al.

(10) Patent No.: US 9,608,685 B2
(45) Date of Patent: Mar. 28, 2017

(54) DEFORMABLE SEAL FOR AN ELECTRONIC DEVICE

(71) Applicant: Apple Inc., Cupertino, CA (US)

(72) Inventors: Ashutosh Y. Shukla, Santa Clara, CA (US); Sawyer I. Cohen, Sunnyvale, CA (US); Scott A. Myers, Saratoga, CA (US); David A. Pakula, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/842,728

(22) Filed: Sep. 1, 2015

(65) Prior Publication Data

US 2017/0063420 A1    Mar. 2, 2017

(51) Int. Cl.
*H04M 1/00* (2006.01)
*H04B 1/3888* (2015.01)
*H04M 1/02* (2006.01)

(52) U.S. Cl.
CPC .......... *H04B 1/3888* (2013.01); *H04M 1/026* (2013.01)

(58) Field of Classification Search
CPC ....... H04W 88/02; H05K 5/06; H05K 5/0004; H04B 1/3888
USPC ............... 455/550.1, 90.3, 347, 575.1, 575.8
See application file for complete search history.

(56) References Cited

U.S. PATENT DOCUMENTS

| | | | |
|---|---|---|---|
| 3,729,205 A | 4/1973 | Kwok | |
| 3,732,835 A | 5/1973 | Long | |
| 6,983,130 B2 * | 1/2006 | Chien | H04M 1/18 379/433.01 |
| 7,690,527 B2 | 4/2010 | Englund | |
| 8,149,575 B2 * | 4/2012 | Yang | H01H 13/86 345/163 |
| 8,295,896 B2 * | 10/2012 | Jeon | A45C 11/00 396/27 |
| 8,403,136 B1 * | 3/2013 | Tsai | H05K 5/061 206/320 |
| 8,838,190 B2 * | 9/2014 | Komiyama | H04M 1/021 455/347 |
| 2008/0132289 A1 * | 6/2008 | Wood | H04B 1/3888 455/566 |
| 2008/0284112 A1 | 11/2008 | Koch et al. | |
| 2012/0146571 A1 * | 6/2012 | Hsu | H02J 7/0044 320/101 |
| 2013/0163159 A1 * | 6/2013 | Mack | G06F 1/1656 361/679.01 |

\* cited by examiner

*Primary Examiner* — Sonny Trinh
(74) *Attorney, Agent, or Firm* — Downey Brand LLP

(57) ABSTRACT

An electronic device that includes a deformable feature designed to seal two or more parts of the electronic device is disclosed. The deformable feature may be designed to deform, in response to a force applied to the deformable feature, with little or no compression. The deformable feature may include a cavity or relief volume extending along the deformable feature to define a space or void in the deformable feature. In response to a force, the deformable feature may deform such that a material (or materials) defining the deformable feature occupies or extends into the space or void, or in a location previously occupied by the space or void. The deformable feature may provide a protective seal between two or more parts that prevents ingress of contaminants, such as a liquid.

20 Claims, 7 Drawing Sheets

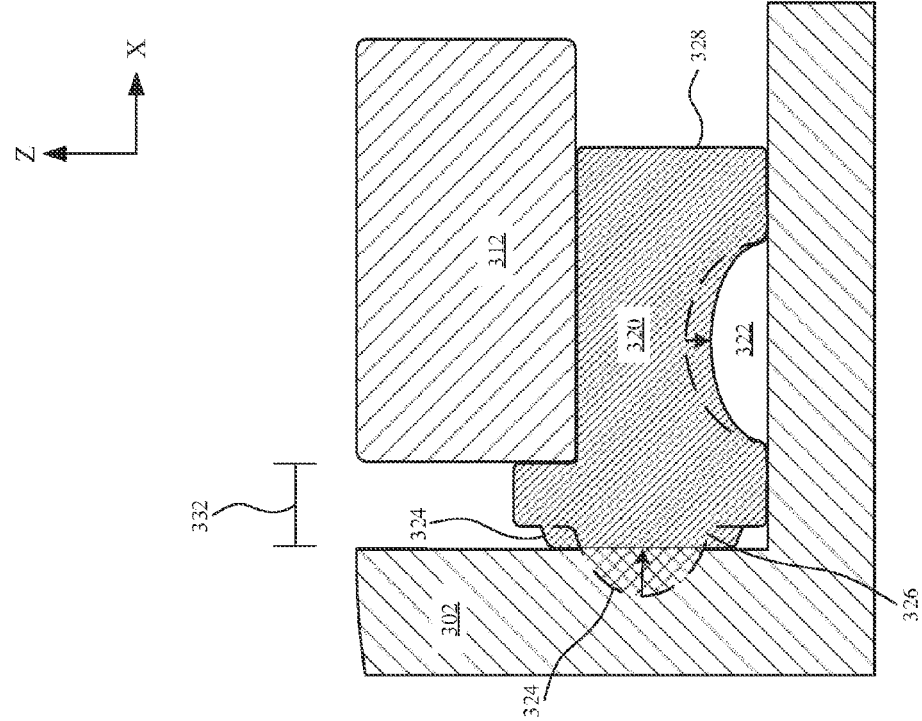
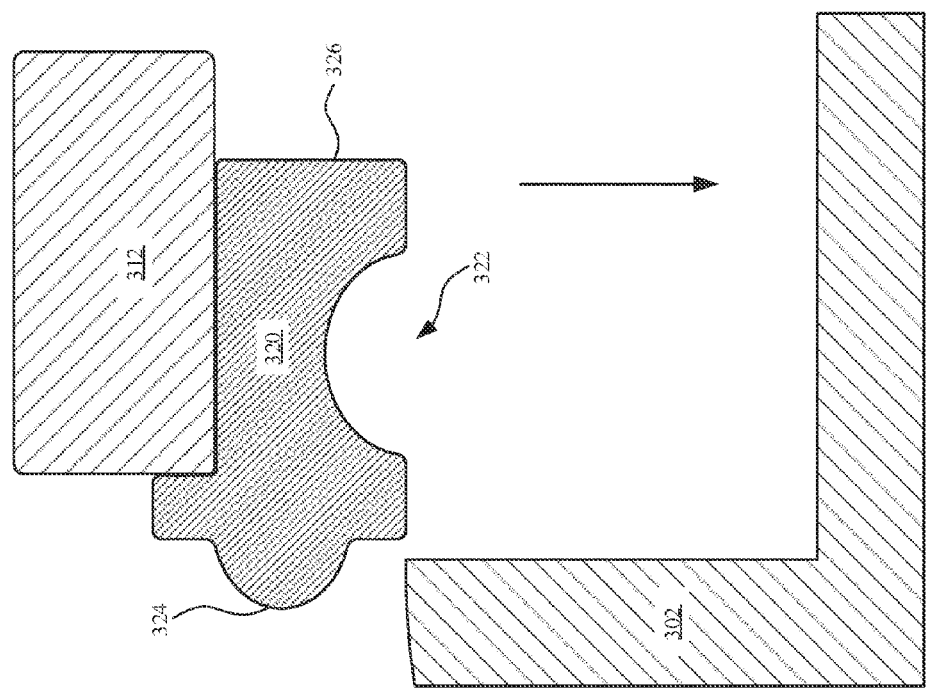

DEFORMABLE SEAL FOR AN ELECTRONIC DEVICE

FIELD

The described embodiments relate generally to an electronic device having a feature designed to prevent ingress of contaminants. In particular, the present embodiments relate to an electronic device having a deformable feature having a relief volume that allows the deformable gasket, in response to a load force, to extend into the relief volume, or in a location previously occupied by the relief volume.

BACKGROUND

An electronic device generally includes two exterior features that join together to enclose several components. Due in part to the electronic device including two exterior features joined together at a joint, the electronic device may include an exposed region located at the joint. Despite one or more forces securing the two exterior features together, the exposed region may be vulnerable to ingress from contaminants such as liquids. Further, ingress of liquid contaminants in certain location may cause damage to critical components of the electronic device.

Some solutions may prevent or limit ingress at the exposed region. For example, a rubber gasket may be positioned between the two exterior features at the exposed region. However, in some cases, it is desirable for the electronic device to maintain a consistent positioning of the two exterior features with respect to each other. As such, the gasket requires a consistent pressure all around the perimeter; otherwise, at least one of the exterior features may bulge or form an inconsistent or dissimilar positioning with respect to other locations. Another solution may include an O-ring. An O-ring is generally known in the art to include a circular or elliptical. However, when the exterior features a polygonal shape, such as a rectangle, the shape of the O-ring may differ enough and create an undesirable fit with one of the exterior features. For example, in some cases, the O-ring is too tight in some regions and/or too loose in other regions.

Both the O-ring and the gasket may include other drawbacks. For example, although the two exterior features may be molded and/or machined in order to mate, in some cases, one or both exterior feature may includes some variations in their final design that may nonetheless be within a specified tolerance. However, using a prefabricated O-ring or gasket may not be able to accommodate these variations and accordingly, may not prevent ingress.

SUMMARY

In one aspect, a deformable feature suitable for preventing ingress through a gap between a first part and a second part in an electronic device is described. The deformable feature may include a body extending around a perimeter of the first part and positioned in the gap between the first part and the second part. The deformable feature may further include a relief volume in the body. In some embodiments, in response to a force applied to the body from the first part securing with the second part, a portion of the body deforms and occupies a portion of the relief volume.

In another aspect, In another aspect, an electronic device is described. The electronic device may include a first part having a first interface surface. The electronic device may further include a second part having a second interface surface having a shape corresponding to the first interface surface. The first interface and the second interface surface may define a gap extending between the first part and the second part. The electronic device may further include a plug feature configured to prevent ingress through the gap. The plug feature may include a body portion in contact with the first interface surface and the second interface surface. The body portion may include an interference region corresponding to an amount of the body portion displaced in response the first part being secured with the second part. The plug feature may further include a relief portion having a volume that accommodates the amount of the body portion corresponding to the interference region.

In another aspect, a method for sealing a first part with a second part, both of which are disposed in an electronic device, is described. The method may include receiving, at the first part, a deformable feature around a perimeter of the first part. The deformable feature may include a relief volume. The method may further include securing the first part with the second part. In some embodiments, securing the first part with the second part may cause a portion of the deformable feature to extend into the relief volume.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which:

FIG. 7 illustrates a cross sectional view of an enlarged view of an alternate embodiment of a deformable feature having a first shape prior to securing an upper assembly with an enclosure, in accordance with the described embodiments;

FIG. 8 illustrates a cross sectional view of the deformable feature shown in FIG. 7, with the deformable feature deforming to a second shape in response to securing the upper assembly with the enclosure;

Figure 1:
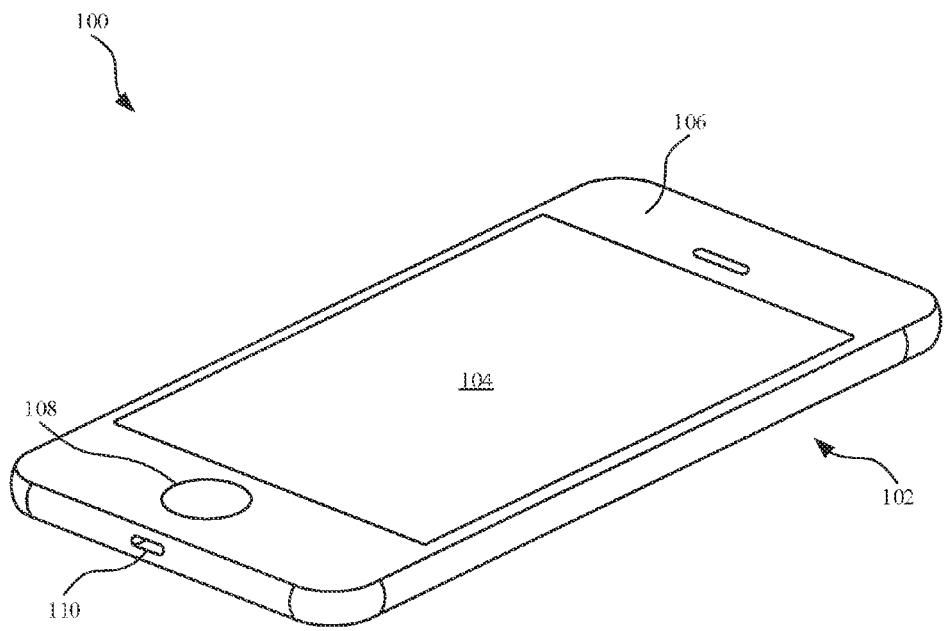
FIG. 1 illustrates an isometric view of an embodiment of an electronic device, in accordance with the described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to an electronic device having a design feature that limits or prevents ingress of contaminants, such as liquids. The design feature may be a deformable feature positioned between two parts and designed to form a seal between the two parts. The deformable feature may change its shape in response to a force applied to the deformable feature. For example, when the two parts are brought together, the deformable feature may deform to a second shape different from its initial (first) shape. Also, the deformable feature may include a material (or materials) that may withstand compression in response to the force applied by securing the two parts together. In this manner, the deformable feature, when changing from the initial shape to the second shape, may maintain the same, or substantially similar, volume. Accordingly, a cross section of the deformable feature may change its shape but may still maintain the same, or substantially similar, cross sectional area.

The deformable feature may include a cavity or relief volume (or relief portion) extending along the deformable feature. Accordingly, the cavity may define a space or void along the deformable feature. In response to a force received by the deformable feature, the cavity allows at least some of the material defining the deformable feature to occupy or extend into the cavity, or a location previously occupied by the cavity, due in part to the deformable feature withstanding compression. By deforming to a different shape and minimizing or preventing compression, the deformable feature allows the first part to mate with the second part in a manner such that the first part maintains a co-planarity with respect to the second part. In this manner, the deformable feature may define an ingress-resistant seal that deforms or changes to a shape that allows two parts to mate in a desirable manner. Further, the deformable feature may be used in a mass-production scale of electronic device in a repeatable manner.

These and other embodiments are discussed below with reference to FIGS. 1-11. However, those skilled in the art will readily appreciate that the detailed description given herein with respect to these Figures is for explanatory purposes only and should not be construed as limiting.

FIG. 1 illustrates an isometric view of an embodiment of an electronic device 100, in accordance with the described embodiments. In some embodiments, the electronic device 100 is a tablet device. In the embodiment shown in FIG. 1, the electronic device 100 is a wireless communication device, such as a smartphone. The electronic device 100 may include an enclosure 102 designed to enclose several operational components, including integrated circuits, a speaker, a microphone, etc. In some embodiments, the enclosure 102 is formed from a metal, such as aluminum. The enclosure 102 may include a rear portion and several sidewalls extending from the rear portion. The electronic device 100 may further include a display 104 designed to display visual content. The display 104 may include a touch-sensitive layer (not shown) integrated with the display 104 such that the display 104 may receive and respond to a touch input by a user. Further, the touch-sensitive layer may include a capacitive touch sensitive layer that may receive and respond to a capacitive coupling with the capacitive touch sensitive layer. A protective layer 106 may overlay the display 104. The protective layer 106 may be formed from a transparent material, such as a glass material that covers the display 104. Also, the electronic device 100 may further include a button 108 designed to receive an additional input that may allow a user to provide a control to the electronic device 100 used to control, for example, an application or "app" visually presented on the display 104. The electronic device 100 may include an internal power source (such a battery) used to provide power in the form of electrical current to several internal components of the electronic device 100. Accordingly, the electronic device 100 may include a charging port 110 designed to receive power in order to provide power to the internal power supply and/or the internal components. Also, although not shown, the electronic device 100 may include one or more control inputs (such as button) disposed in various locations around the enclosure 102, with the control inputs offering different control features for the electronic device 100.

Figure 2:
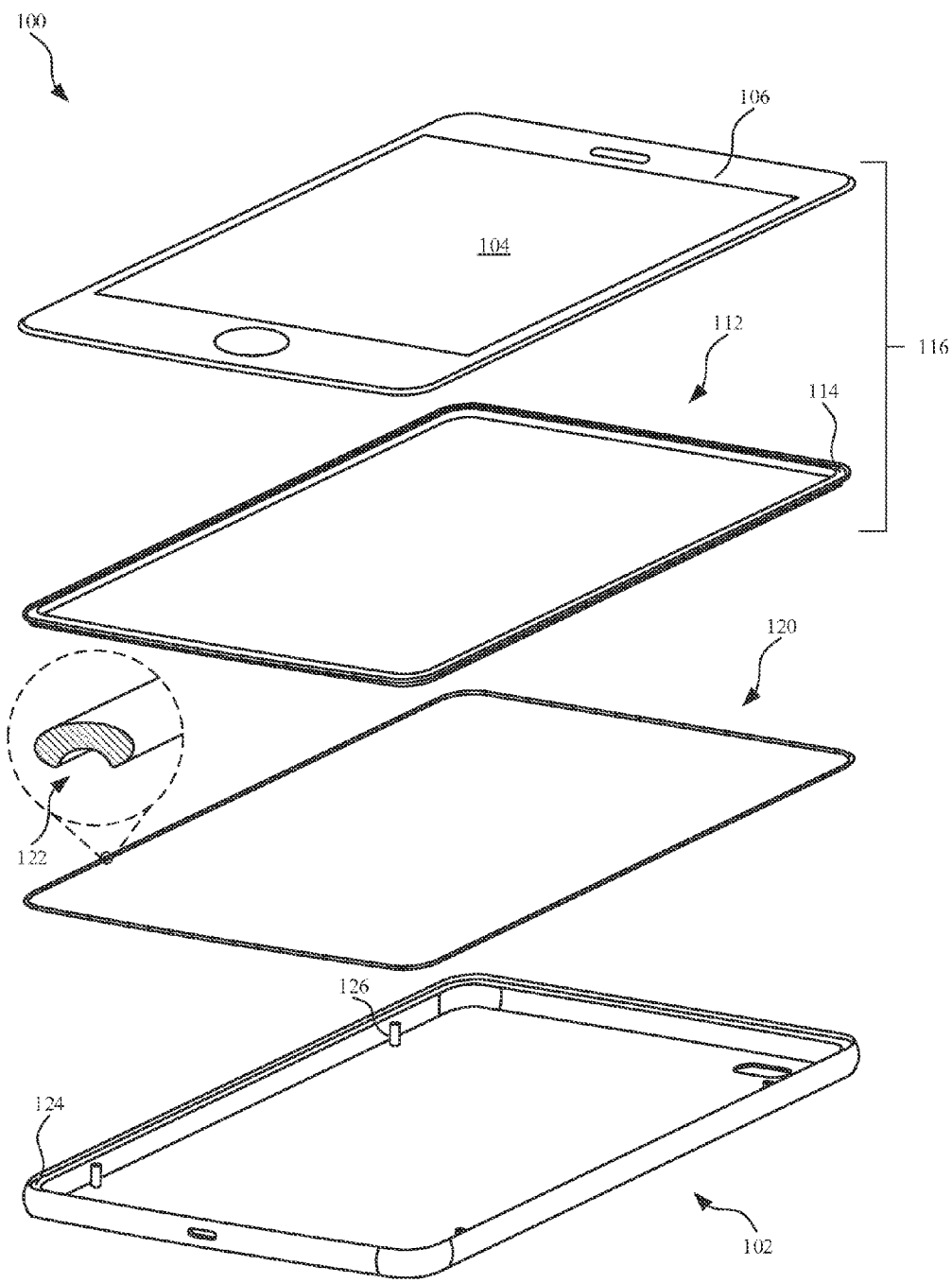
FIG. 2 illustrates an exploded view of the electronic device shown in FIG. 1, showing several internal features of the electronic device.

FIG. 2 illustrates an exploded view of the electronic device 100 shown in FIG. 1, showing several internal features of the electronic device 100. For example, a support feature 112 may be used with the display 104 and the protective layer 106. The support feature 112 may be referred to as a frame that provides structural support for the display 104 and/or the protective layer 106. In some embodiments, the support feature 112 includes a polymeric material, such as plastic. Also, the support feature 112 may include a support surface 114 designed to receive the display 104 and/or the protective layer 106. In some embodiments, the protective layer 106 is bonded with the support surface by an adhesive (not shown). The display 104, the protective layer 106, and the support feature 112 may combine to define an upper assembly 116 (or at least a portion of the upper assembly 116) of the electronic device 100. Also, although not shown, the support feature 112 may include several protruding features (not shown), each of which is designed to mate with one of the bosses of the enclosure 102. For example, a first boss 126 of the enclosure may receive a first protruding feature of the support feature 112. Alternatively, the support feature 112 may include several openings (not shown), each of which is designed to receive a fastener that extends into the bosses. Other features, such as clips or snaps, may be used to provide a retaining force between the support feature 112 and the enclosure 102.

Also, the electronic device 100 may include a deformable feature 120. The deformable feature 120 may be a body used as a protective seal that may prevent ingress between two parts, such as the upper assembly 116 and the enclosure 102. In this regard, the deformable feature 120 may be a plug feature designed to provide a seal between two or more parts in the electronic device 100. The deformable feature 120 may be applied in a liquid form to the support feature 112 and then cured with the support feature 112. In this manner, the deformable feature 120 may include a custom fit that secures to various regions of the support feature 112. This may be advantageous over using a pre-fabricated O-ring or gasket, as those structures may not provide the same custom form and fit.

In some embodiments, the deformable feature 120 includes a thermoplastic elastomer ("TPE"). Further, in some embodiments, the deformable feature 120 a thermoplastic polyurethane ("TPU"). The TPE and/or TPU can be molded with the support feature 112 by, for example, a dual shot molding operation. For example, a mold core and first mold cavity (not shown) may be used to receive a polymeric material by means of injection molding or compression molding, as non-limiting examples, in order to form the support feature 112. Then, a second operation may be performed by replacing the first mold cavity with a second mold cavity, with the second mold cavity defining a region that receive the TPE and/or TPE in order to form the deformable feature 120.

However, in the embodiment shown in FIG. 2, the deformable feature 120 includes a liquid silicone rubber ("LSR"). The deformable feature 120 formed from LSR may provide several advantages. For example, LSR may resist breakdown when exposed to certain chemicals. This may allow the deformable feature 120 to continue to prevent ingress even after exposure to chemicals that may break down other less chemical-resistant materials. Also, the LSR material allows the deformable feature 120 to be formed on the relatively thin walls of the support feature 112 in a desired manner and may not "creep" or extend into unwanted locations along the support feature 112. Further, LSR material allows the deformable feature 120 to include a relatively small thickness that may allow the deformable feature 120 to be more readily positioned between two or more parts. Also, the LSR include a relatively low durometer that may provide the deformable feature 120 with some elasticity thereby increasing the deformability of the deformable feature 120.

Also, the deformable feature 120, when formed from LSR, may be applied to the support feature 112 then cured in place by a heating element (not shown). By forming a deformable feature 120 using a liquid or non-cured material, such as LSR, to the support feature 112 and subsequently curing, the deformable feature 120 may be able to accommodate variations in the formation of the support feature 112. For example, several support features undergoing their respective molding operations may include some structural differences within a specified tolerance. However, by applying and curing an LSR material, for example, to the each of the support features, each support feature receives a customized deformable feature designed to fit around the various contours and curvatures of each support feature regardless of the structural differences of each support feature.

Also, as shown in the enlarged view, the deformable feature 120 may include a cavity 122. The cavity 122 may be formed in the deformable feature by, for example, a mold assembly (not shown). The cavity 122 may be referred to as a relief volume that allows the deformable feature 120, in response to a force, to deform, collapse, or extend into the cavity 122. In other words, a portion of the material defining the deformable feature 120 may occupy or extend into the cavity 122, or a location previously inhabited by the cavity 122. This will be shown and described in detail below.

Also, as shown, the deformable feature 120 may extends in a continuous manner. However, in other embodiments, the deformable feature 120 is discontinuous in some locations to allow, for example, securing features (including snaps, clips, fasteners, etc.) to secure the upper assembly 116 with the enclosure 102. Also, the cavity 122 may be disposed in any location in which the deformable feature 120 is located. When the structural features shown in FIG. 2 are assembled, the deformable feature 120 is secured with the upper assembly 116 and may be received by a support surface 124 of the enclosure 102.

Figure 3:
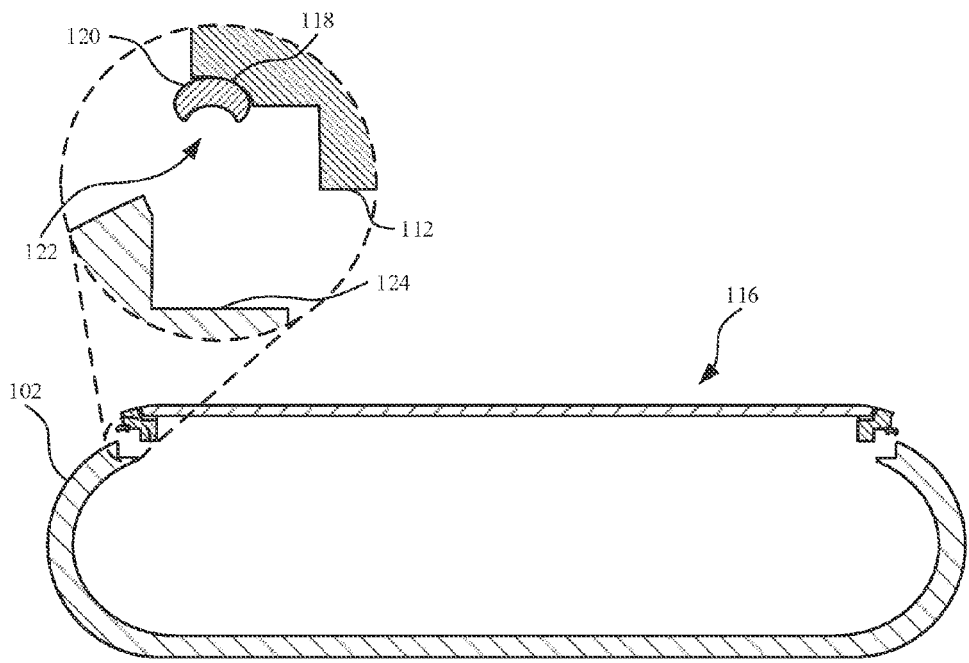
FIG. 3 illustrates a cross sectional view of the electronic device shown in FIG. 2, prior to securing the upper assembly with the enclosure.

FIG. 3 illustrates a cross sectional view of the electronic device 100 shown in FIG. 2, prior to securing the upper assembly 116 with the support surface 124 of the enclosure 102. For purposes of simplicity, several internal components (such as memory circuits, processor circuits, battery, etc.) are removed from the electronic device 100. As shown in the enlarged view, the deformable feature 120 is secured with the support feature 112. In particular, the deformable feature 120 is secured in a notch feature 118 of the support feature 112. The notch feature 118 may extend around the perimeter of the support feature 112 to receive the deformable feature 120. However, in other embodiments, the support feature 112 does not include a notch feature 118 and the deformable feature 120 is disposed along an edge of the support feature 112 that may extend around the perimeter of the support feature 112.

As shown in FIG. 3, a cross section of the deformable feature 120 shows the deformable feature 120 including a first shape that includes a cross sectional area that may correspond to a volume of the deformable feature 120. Also, the cavity 122 of the deformable feature 120 includes a first cross sectional area that may correspond to a first volume of the cavity 122.

Figure 4:
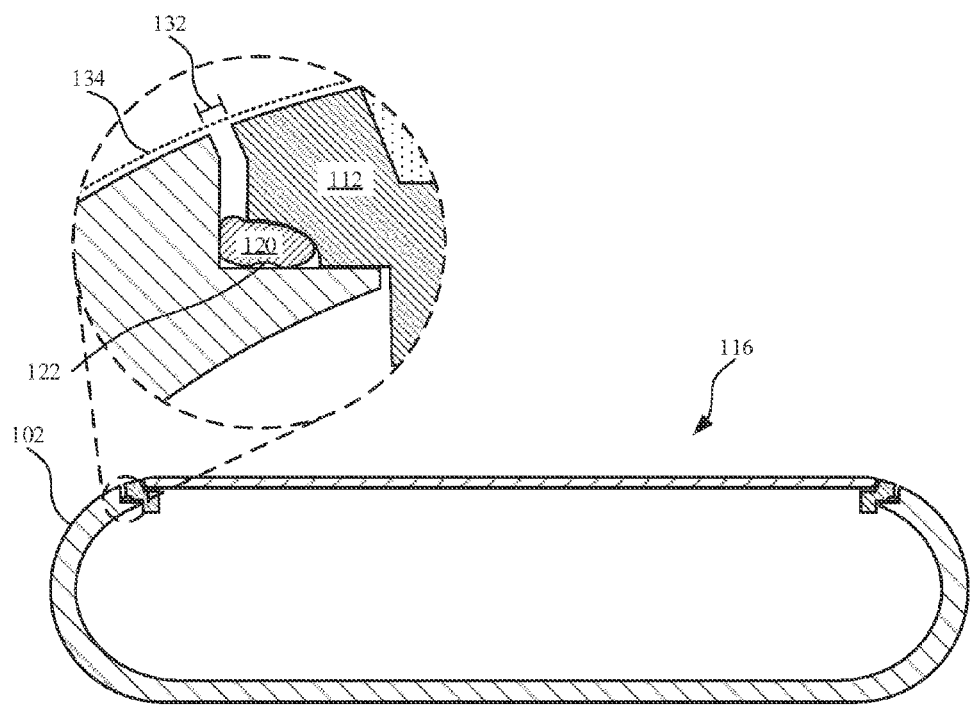
FIG. 4 illustrates a cross sectional view of the electronic device in FIG. 3, with the upper assembly secured with the enclosure.

However, both the deformable feature 120 and the cavity 122 may change when the upper assembly 116 is secured with the enclosure 102. For example, FIG. 4 illustrates a cross sectional view of the electronic device 100 in FIG. 3, with the upper assembly 116 secured with the enclosure 102. As shown, the deformable feature 120 may deform and extend into a gap 132 between the support feature 112 and the enclosure 102. In this manner, the deformable feature 120 may define a seal between the support feature 112 and the enclosure 102 and prevent ingress of contaminants via the gap 132.

Also, as shown in FIG. 4, the deformable feature 120, in response to a force (or forces) from the support feature 112 and the enclosure 102 acting on the deformable feature 120, may change from the first shape to second shape different from the first shape. However, the deformable feature 120 may retain, or at least substantially retain, its initial cross sectional area due in part to the material makeup of the deformable feature 120. In other words, the deformable feature 120 may provide provides resistance to the forces applied by the enclosure 102 and the support feature 112, and in particular, when the enclosure 102 and the support feature 112 are secured together by snaps, clips, fasteners, etc.

In order to retain its initial cross sectional area, some of the material defining the deformable feature 120 may occupy or extend into the cavity 122. In other words, some of the material defining the deformable feature 120 may occupy or extend into a location previously occupied by the cavity 122. Accordingly, as shown in FIG. 4, the cavity 122 may reduce from a first cross sectional area (show in FIG. 3) to second, smaller cross sectional area. It should be understood that the volume of the cavity 122 may also decrease in accordance with the decreased cross sectional area of the cavity 122.

The cavity 122 of the deformable feature 120 may be designed to accommodate any size of the gap 132 within a specified tolerance. For example, when the gap 132 is at its smallest distance, at least some of the material defining the deformable feature 120 may completely occupy the cavity 122, or a location previously occupied by the cavity 122. In this manner, the material defining the deformable feature 120 does not "bulge," or extend beyond, the location previously occupied by the cavity 122. This may prevent the deformable feature 120 from applying a counterforce against the support feature 112, and may allow the support feature 112 to be co-planar, or at least approximately co-planar, with respect to the enclosure 102 along a curved plane 134 shown as a dotted line. On the other hand, when the gap 132 is at its greatest distance within the specified tolerance, only a relatively small portion of the deformable feature 120 may occupy or extend into the cavity 122, or a location previous occupied by the cavity 122. In either event, the cavity 122 is designed for a range of distances of the gap 132 within a specified tolerance.

To further illustrate the features of a deformable feature, FIGS. 5-10 offer various embodiments of a deformable feature and a cavity in the deformable feature. It will be appreciated that any deformable feature described in FIGS. 5-10 may include any feature (or features), and any material (or materials) previously described for a deformable feature. Also, only the relevant portions of the electronic device may be shown in FIGS. 5-10.

Figure 5:
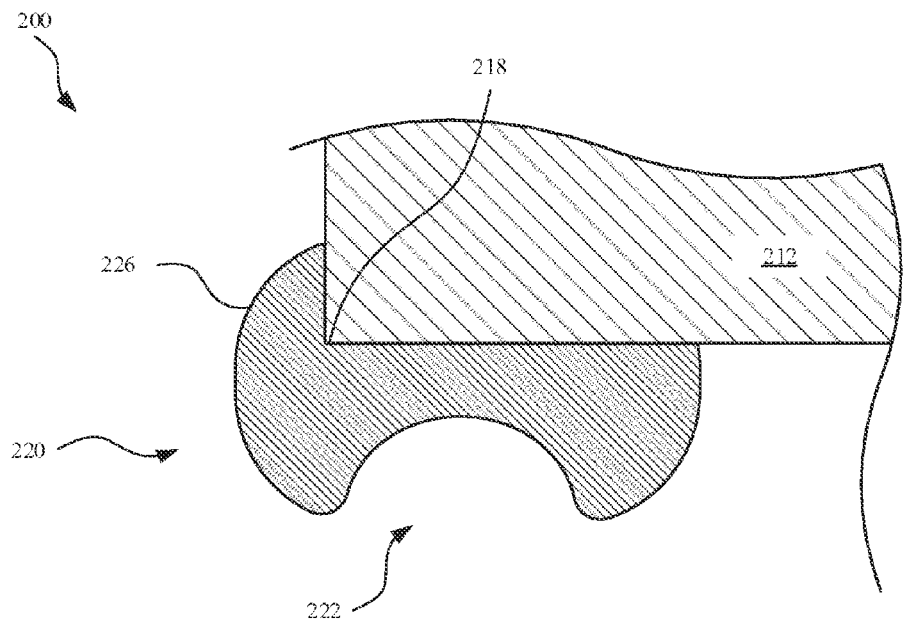
FIG. 5 illustrates a cross sectional view of an enlarged view of an embodiment of a deformable feature having a first shape prior to securing an upper assembly with an enclosure, in accordance with the described embodiments.

FIG. 5 illustrates a cross sectional view of an embodiment of an enlarged view of an electronic device 200 including a deformable feature 220 having a first shape 226 prior to securing an a first part with a second part, in accordance with the described embodiments. As shown, the deformable feature 220 may be formed on an edge 218 of a support feature 212. The first shape 226 of the deformable feature 220 may include a first cross sectional area, with the deformable feature 220 having a first volume (not shown) in accordance with the first cross sectional area. Also, as shown, the deformable feature 220 may include a cavity 222 that includes a first shape having a first cross sectional area.

Figure 6:
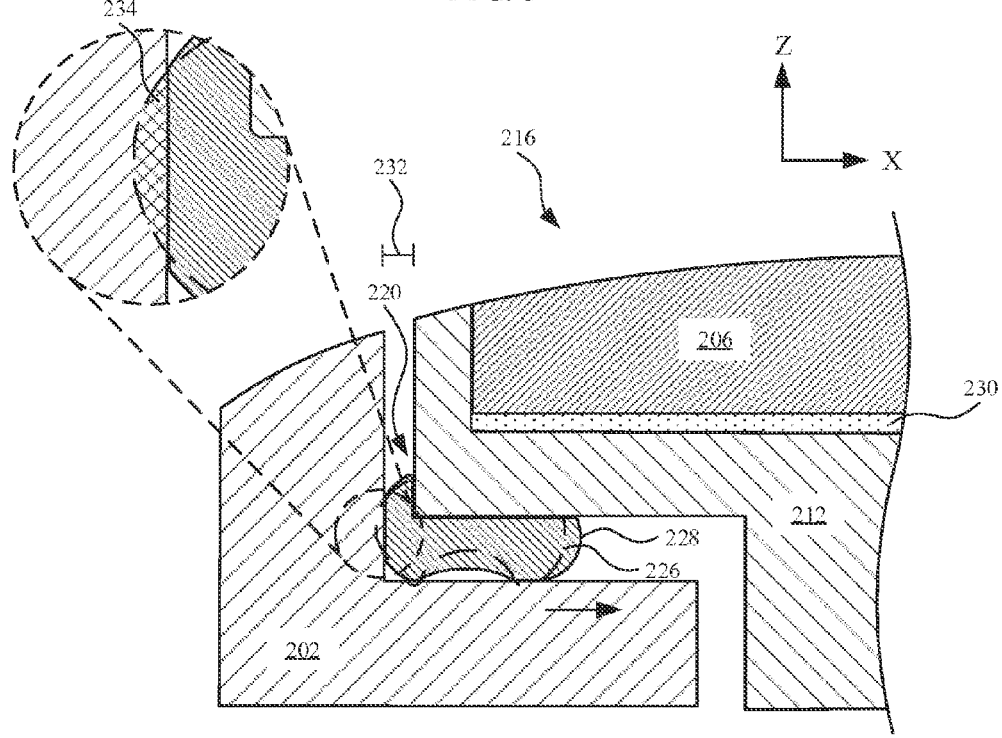
FIG. 6 illustrates a cross sectional view of the deformable feature shown in FIG. 5, with the deformable feature deforming to a second shape in response to securing the upper assembly with the enclosure.

As the upper assembly 216 is secured with the enclosure 202, the deformable feature 220 may deform in response to a force (or forces) applied by upper assembly 216 and/or the enclosure 202. For example, FIG. 6 illustrates a cross sectional view of the deformable feature 220 shown in FIG. 5, with the deformable feature 220 deforming to a second shape 228 in response to securing the upper assembly 216 with the enclosure 202. As shown, the second shape 228 is different from the first shape 226 (shown as a dotted line).

As shown in the enlarged view, the deformable feature 220 may include an interference region 234 that may be referred to as an amount of displaced material of the deformable feature 220 as a result of securing or mating the support feature 212 with the enclosure 202. In other words, at least some of the material of the deformable feature 220 subject to deformation and displacement includes the interference region 234. The cavity 222 may include a volume designed to receive or accommodate the interference region 234 when the support feature 212 secures with the enclosure 202. Further, the cavity 222 may accommodate the interference region 234 for any size of a gap 232 within a specified tolerance. For example, if the gap 232 between the enclosure 202 and the support feature 212 is reduced, then the interference region 234 may increase and the cavity 222 nonetheless accommodates the interference region 234 despite the increase.

However, the deformable feature 220 may maintain the same, or substantially similar, cross-sectional area despite the change from the first shape 226 to the second shape 228, as the deformable feature 220 may resist the applied forces. Accordingly, the deformable feature 220 may retain its initial, or first, volume despite the change to the second shape 228. Further, a portion of the deformable feature 220 may occupy or extend into the cavity 222, or a location previously occupied by the cavity 222, such that the cavity 222 reduces from a first shape (shown in FIG. 5) to a second shape shown in FIG. 6. Accordingly, the cross sectional area of the cavity 222 may be reduced.

Also, in response to the forces changing the shape of the deformable feature 220, the deformable feature 220 may be designed to generally extend laterally in single direction, such as an x-axis (denoted by an arrow), or in a plane that lies along the x-axis. In this manner, the deformable feature 220 may provide minimal or no counterforce to the upper assembly 216 (that includes a protective layer 206 secured with the support feature 212 via an adhesive 230), and the upper assembly 216 is positioned co-planar with respect to the enclosure 202 along a curved plane in a manner previously described. In other words, the deformable feature 220 may not provide a force to the upper assembly 216 along a z-axis perpendicular to the x-axis. However, the gap 232 may accommodate any additional displaced or deformed material of the deformable feature 220 and the positioning of the upper assembly 216 may not be disturbed.

FIG. 7 illustrates a cross sectional view of an of an enlarged view of an alternate embodiment of a deformable feature 320 having a first shape 326 prior to securing a first part 302 with a second part 312, in accordance with the described embodiments. The first part 302 and the second part 312 may be, for example, part of an enclosure and part of a support feature, respectively, of an electronic device. Also, the first part 302 may include a first interface surface and the second part 312 may include a second interface surface having shape that corresponds to the first interface surface such that the first part may mate with the second part, similar to the support feature 112 mating with the enclosure 102 (shown in FIG. 2).

In addition to the deformable feature 320 having a cavity 322, the deformable feature 320 may further include a protruding feature 324 providing the deformable feature 320 with additional material that may increase a seal between the first part 302 and the second part 312. Accordingly, the protruding feature 324 may increase an amount of material corresponding to an interference region when the first part 302 is mated or secured with the second part 312. Also, the deformable feature 320 may include a first shape 326 having a first cross sectional area, with the deformable feature 320 having a first volume (not shown) in accordance with the first cross sectional area. Also, as shown, the deformable feature 320 may include a cavity 322 that includes a first shape having a first cross sectional area.

FIG. 8 illustrates a cross sectional view of the deformable feature 320 shown in FIG. 7, with the deformable feature 320 deforming to a second shape 328 in response to securing the first part 302 with the second part 312. The first shape 326 (shown in FIG. 7) is shown as a dotted line superimposed over the second shape 328. In response to a force applied to the protruding feature 324 when the first part 302 and the second part 312 are secured together, the material of the deformable feature 320 may transmit the force (or at least part of the force) to other locations of the deformable feature 320 to deform to the second shape 328. Due in part to the deformable feature 320 being made from a generally non-compressible material, the material of the deformable feature 320 may apply an opposing force to the transmitted force. However, the cavity 322, being a space or void in the deformable feature 320, may not apply an opposing force, and the deformable feature 320 may extend into the cavity 322, or a location previously occupied by the cavity 322. Further, a gap 332 between the first part 302 and the second part 312 may allow the protruding feature 324 to extend into the gap 332.

As shown in FIG. 8, the cavity 322 may be designed to receive or accommodate an interference region 334 even when the interference region 334 may include additional material due in part to the protruding feature 324. In addition, the cavity 322 may accommodate the interference region 334 even when the gap 332 decreases within a specified tolerance.

However, the deformable feature 320 may maintain the same, or substantially similar, cross-sectional area despite the change from the first shape 326 to the second shape 328, as the deformable feature 320 may resist the applied forces. Accordingly, the deformable feature 320 may retain its initial, or first, volume despite the change to the second shape 328. Further, a portion of the deformable feature 320 may occupy or extend into the cavity 322, or a location previously occupied by the cavity 322, such that the cavity 322 reduces from a first shape (shown in FIG. 7) to the second shape shown in FIG. 8. Accordingly, the cross sectional area of the cavity 322 may be reduced. Further, in some cases, the cavity 322 is designed such that the cavity 322 may be completely occupied by some of the material of the deformable feature 320 based upon the size of the gap 332 as well as the amount of material of the interference region 334. For example, as a result of the gap 332 being reduced, an additional force may be applied to the deformable feature 320 by the first part 302 and/or the second part 312, and at least some of the material of the deformable feature 320 may completely occupy the cavity 322, or a location previously occupied by the cavity 322.

Also, the deformable feature 320 may generally extend in single direction, such as an x-axis, or in a plane that lies along the x-axis. In this manner, the deformable feature 320 does not provide a counterforce to the second part 312, and the second part 312 is positioned co-planar with respect to the first part 302 along a curved plane in a manner previously described. In other words, the deformable feature 320 does not provide a force to the upper assembly 316 along a z-axis perpendicular to the x-axis.

Also, in response to the forces changing the shape of the deformable feature 320, the deformable feature 320 may be designed to generally extend laterally in single direction, such as an x-axis (denoted by an arrow), or in a plane that lies along the x-axis. In this manner, the deformable feature 320 may provide minimal or no counterforce to the second part 312, and the second part 312 is positioned co-planar with respect to the first part 302. In other words, the deformable feature 320 may not provide a force to the second part 312 along a z-axis perpendicular to the x-axis. However, the gap 332 may accommodate any additional displaced or deformed material of the deformable feature 320 and the positioning of the second part 312 may not be disturbed.

Figure 9:
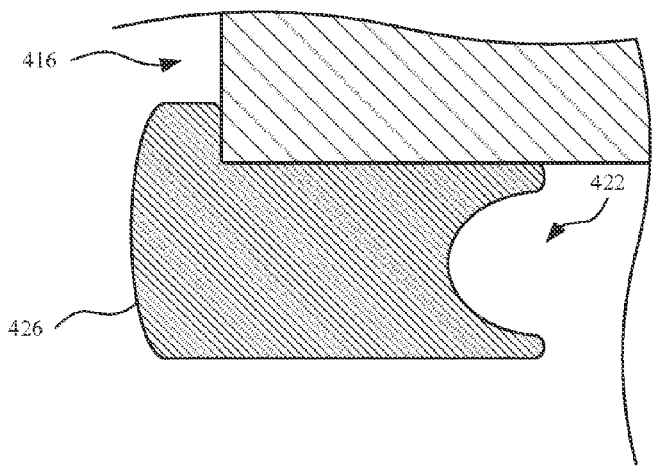
FIG. 9 illustrates a cross sectional view of an enlarged view of an alternate embodiment of a deformable feature having a first shape prior to securing an upper assembly with an enclosure, in accordance with the described embodiments.

FIG. 9 illustrates a cross sectional view of an of an enlarged view of an alternate embodiment of a deformable feature 420 having a first shape 426 prior to securing an upper assembly 416 with an enclosure 402, in accordance with the described embodiments. The deformable feature 420 may include a cavity in other locations. For example, the deformable feature 420 may include a cavity 422 on a side region (rather than a base region, as shown in previous embodiments), with the cavity 422 including a first shape having a first cross sectional area. The deformable feature 420 may include a first shape 426 having a first cross sectional area, with the deformable feature 420 having a first volume (not shown) in accordance with the first cross sectional area.

Figure 10:
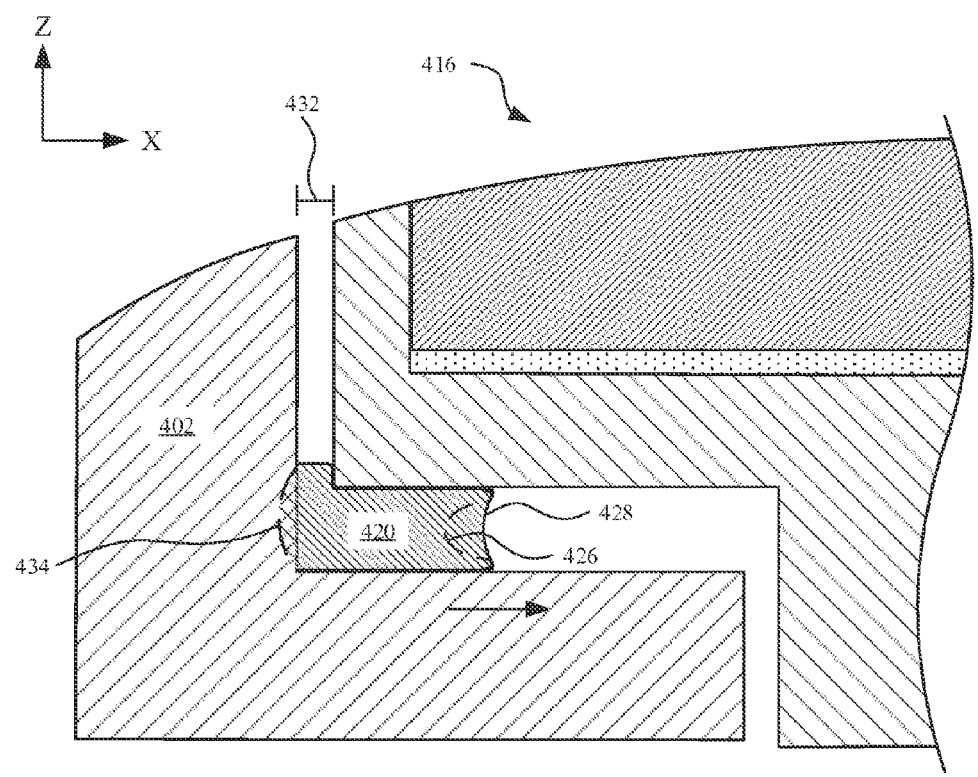
FIG. 10 illustrates a cross sectional view of the deformable feature shown in FIG. 9, with the deformable feature deforming to a second shape in response to securing the upper assembly with the enclosure.

FIG. 10 illustrates a cross sectional view of the deformable feature 420 shown in FIG. 9, with the deformable feature 420 deforming to a second shape 428 in response to securing the upper assembly 416 with the enclosure 402. As shown, the second shape 428 is different from the first shape 226 (shown as a dotted line). However, the deformable feature 420 may maintain the same, or substantially similar, cross-sectional area despite the change from the first shape 426 to the second shape 428, as the deformable feature 420 may resist the applied forces. Also, the deformable feature 420 may retain its initial, or first, volume despite the change to the second shape 428. Further, a portion of the deformable feature 420 may occupy or extend into the cavity 422, or a location previously occupied by the cavity 422, such that the cavity 422 reduces from a first shape (shown in FIG. 9) to a second shape shown in FIG. 10. Accordingly, the cross sectional area of the cavity 422 may be reduced. Accordingly, the cavity 422 located on a side portion of the deformable feature 420 may nonetheless produce a similar result as previous embodiments, as an interference region 434, defined a displaced amount of material of the deformable feature 420, may be accommodated by the cavity 422.

Also, in response to the forces changing the shape of the deformable feature 420, the deformable feature 420 may be designed to generally extend laterally in single direction, such as an x-axis (denoted by an arrow), or in a plane that lies along the x-axis. In this manner, the deformable feature 420 may provide minimal or no counterforce to the upper assembly 416, and the upper assembly 416 is positioned co-planar with respect to the enclosure 402 along a curved plane in a manner previously described. In other words, the deformable feature 420 may not provide a force to the upper assembly 416 along a z-axis perpendicular to the x-axis. However, a gap 432 may accommodate any additional displaced or deformed material of the deformable feature 420 and the positioning of the upper assembly 416 may not be disturbed.

Figure 11:
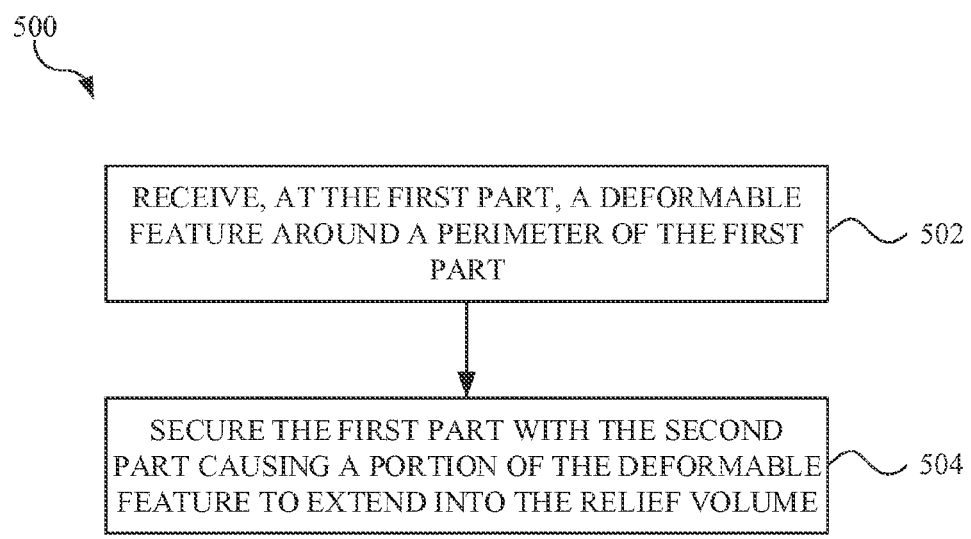
FIG. 11 illustrates a flowchart showing a method for sealing a first part with a second part, both of which are disposed in an electronic device, in accordance with the described embodiments.

FIG. 11 illustrates a flowchart 500 showing a method for sealing a first part with a second part, both of which are disposed in an electronic device, in accordance with the described embodiments. In step 502, a deformable feature is received, at the first part, around a perimeter of the first part.

In some embodiments, the first part is a support feature used to carry a protective layer and a display, as non-limiting examples. The deformable feature may include an LSR material that is applied, in liquid form, to the first part and then cured in place by a heating operation. Also, the deformable feature may be applied and cured to include a cavity or relief volume in the deformable feature.

In step 504, the first part is secured with the second part. By securing the first part with the second part, one or more forces may be applied to the deformable feature, causing a portion of the deformable feature to extend into the relief volume. While the deformable feature may change its shape in response to the force (or forces), the cross sectional area may remain the same, or at least substantially the same. Accordingly, the volume of the deformable feature may remain the same, or at least substantially the same. However, the relief volume may reduce in size and shape in order to accommodate the deformation of the deformable feature.

While the embodiments of a deformable feature are shown and described as being initially secured with an upper assembly, and in particular a support feature of an upper assembly, the deformable feature may be initially applied to the enclosure using various mold techniques previously described.

Although the deformable features are shown and described applications including electronic devices, such as tablets and smartphones, the deformable features may be located in other electronic devices that require a seal for ingress prevention. For example, a wearable electronic device, such as an electronic watch, may include one or more of the described embodiments of a deformable feature. Also, a computing device, such as a laptop computer, may include one or more of the described embodiments of a deformable feature.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A deformable feature suitable for preventing ingress through a gap between a first part and a second part in an electronic device, the deformable feature comprising:
  a body positioned in the gap between the first part and the second part, the body having a cavity having a first volume,
  wherein in response to a force applied to the body from the first part securing with the second part, the body forms an ingress barrier at the gap and a portion of the body deforms defining a displaced portion and the cavity reduces to a second volume less than the first volume to accommodate the displaced portion.

2. The deformable feature of claim 1, wherein the body comprises a cross sectional area having a first shape, and wherein in response to the force applied to the body, the body deforms to a second shape that maintains the cross sectional area.

3. The deformable feature of claim 1, wherein the body defines a seal between the first part and the second part.

4. The deformable feature of claim 1, wherein the body comprises a liquid silicone rubber applied to the first part and cured to the first part.

5. The deformable feature of claim 1, wherein in response to the force applied to the body, the cavity accommodates a portion of the body deformed by the force applied.

6. The deformable feature of claim 1, wherein the force applied includes the first part secured with the second part, and wherein the body allows the first part to be positioned co-planar with the respect to the second part.

7. The deformable feature of claim 1, wherein the body, in response to the force applied to the body, deforms but does not compress.

8. An electronic device, comprising:
  a first part having a first interface surface;
  a second part having a second interface surface having a shape corresponding to the first interface surface, the first interface surface and the second interface surface defining a gap extending between the first part and the second part; and
  a plug feature configured to prevent ingress through the gap, the plug feature comprising:
    a body portion in contact with the first interface surface and the second interface surface, the body portion having an interference region corresponding to an amount of the body portion displaced in response the first part being secured with the second part, and
    a relief portion having a volume that accommodates the amount of the body portion corresponding to the interference region.

9. The electronic device of claim 8, wherein the body portion comprises a protruding feature that extends from the body portion to define the interference region.

10. The electronic device of claim 9, wherein the first part comprises a support feature configured to carry a protective layer, and wherein the plug feature is disposed on and cured to the support feature.

11. The electronic device of claim 8, wherein the plug feature comprises a liquid silicone rubber.

12. The electronic device of claim 8, wherein the plug feature changes from a first shape to a second shape in response to the relief portion accommodating the interference region, and wherein the plug feature maintains a cross sectional area that is constant when the plug feature changes from the first shape to the second shape.

13. The electronic device of claim 8, wherein the first part is co-planar with respect to the second along a curved plane.

14. The electronic device of claim 8, wherein the body portion is configured to extend laterally in a single direction in response to the first part being secured with the second part.

15. A method for sealing a first part of an electronic device with a second part of the electronic device, the method comprising:
  receiving a deformable feature that engages the first part and the second part, the deformable feature having a relief portion; and
  securing the first part with the second part, thereby displacing an amount of the deformable feature, the amount accommodated by the relief portion.

16. The method of claim 15, further comprising curing the deformable feature with the first part.

17. The method of claim 16, further comprising causing the deformable feature to extend into the relief portion comprises deforming the deformable feature from a first shape having a cross sectional area to a second shape having the cross sectional area.

18. The method of claim 16, wherein curing the deformable feature with the first part comprises:
   receiving a liquid silicone rubber to the first part that carries a protective layer and a display of the electronic device; and
   heating the liquid silicone rubber.

19. The method of claim 18, securing the first part with the second part comprises securing a support feature with an enclosure of the electronic device.

20. The method of claim 15, wherein securing the first part with the second part causes the relief portion to reduce in size.

* * * * *